J. L. CREVELING.
ELECTRIC REGULATION.
APPLICATION FILED AUG. 17, 1916. RENEWED JAN. 21, 1922.
1,412,273.                                      Patented Apr. 11, 1922.
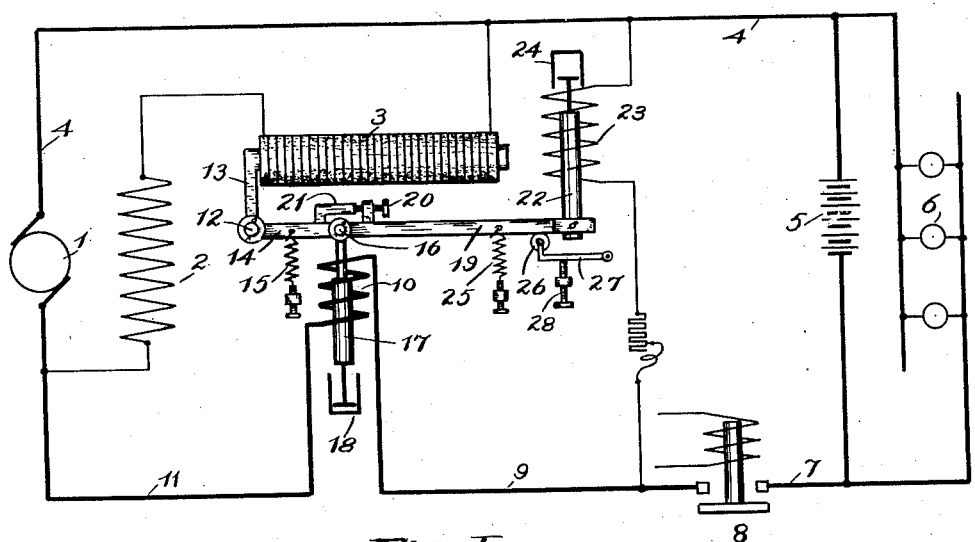
Fig. I.
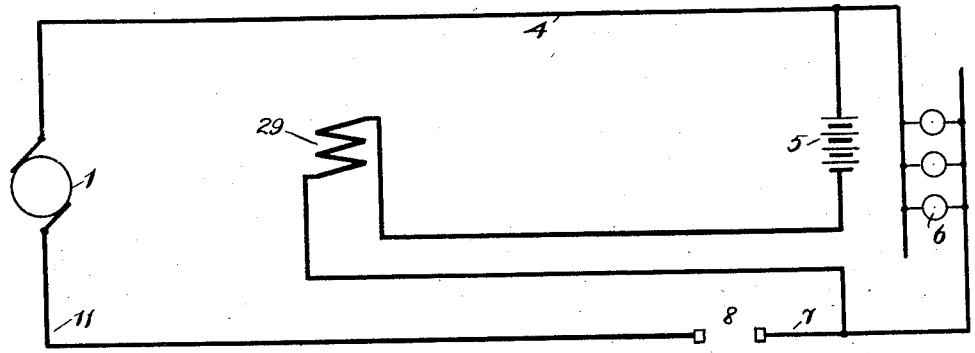
Fig. II.
INVENTOR
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,412,273. Specification of Letters Patent. Patented Apr. 11, 1922.

Application filed August 17, 1916, Serial No. 115,418. Renewed January 21, 1922. Serial No. 531,001.

*To all whom it may concern:*

Be it known that I, JOHN L. CREVELING, a citizen of the United States, residing in White Plains, county of Westchester, and State of New York, have invented certain new and useful Improvements in Electric Regulations, of which the following is a description.

My invention pertains to that class of electric regulation wherein it is desired to regulate a controllable source of electrical potential difference and has for a particular object to provide means whereby said source may be automatically regulated in a predetermined manner. A further object of my invention is to provide means whereby the current in a circuit supplied from said source may be held within predetermined limits and means whereby the voltage across a circuit supplied by said source may also be held from exceeding a predetermined limit. As such systems of regulation are particularly useful for regulating a dynamo operating to charge a storage battery and maintain lamps or other translating devices and more especially when the dynamo is driven at variable speeds causing its voltage and consequent current output to tend to widely vary, my invention will be described with particular reference to such a system.

In the drawing, Fig. I. is a diagrammatic representation of one type of system embodying the essentials of my invention.

Fig. II. shows a portion of a system similar to that of Fig. I. in which a modification is shown without departing from my invention.

In the drawing, 1 represents a dynamo or generator provided with the usual field coil 2, having in series therewith a regulating device or element, in this instance indicated as a carbon pile 3, and it will be obvious that the dynamo may be regulated by regulating the pressure upon the carbon pile 3 in a well known manner. 4 represents the positive lead of the dynamo which is in electrical communication with the positive side of the storage battery 5 and the positive terminals of lamps or other translating devices indicated at 6. The negative terminals of the translating devices 6 and the battery 5 are in communication with the lead 7 carried to one side of any suitable automatic switch indicated at 8. This switch, the mere presence of which is indicated in the drawing for the sake of clearness, is preferably one of the automatic variety adapted to close its circuit when the generator voltage is substantially equal to or slightly in excess of that of the storage battery and to open the circuit when the generator voltage falls very slightly below that of the storage battery in such manner as to prevent back discharge from the battery through the generator.

The opposite terminal of the switch 8 is connected as by the lead 9 with one end of the series coil or solenoid 10, the opposite end of which is connected as by the lead 11 with the negative brush of the generator 1. The pivot 12 carries a lever having arms 13 and 14. The arm 13 bears against one end of the pile 3 and, therefore, may be used to determine the pressure upon the said pile and the regulating operation thereof. The lever 14 is swung in a clockwise direction by the adjustable spring 15 which tends to increase the pressure upon the pile 3. The lever 14 carries at its outward extremity an adjustable knuckle joint 16 which may be raised by raising the core 17 pivotally attached thereto and preferably made of iron or other magnetic material and inserted within the coil or solenoid 10 in such manner that energization of the said coil tends to raise the core 17 against the action of the dashpot arrangement 18 so as to decrease the pressure upon the pile 3. The limb 19, attached to the limb 14 at the knuckle joint including the pin 16, is free to move about the pin 16 in a clockwise direction but restrained from moving in the opposite direction beyond a certain adjustable position which may be determined by the screw 20 which engages the projection 21 fixedly attached to the lever 14. The limb 19 carries at its opposite extremity a core of magnetic material 22 surrounded by a solenoid 23 in shunt across the generator leads and which when energized tends to lift the core 22 against the action of the dashpot arrangement 24 and against the action of adjustable spring 25 so as to tend to swing lever 14 and lever 13 and reduce the pressure upon the carbon pile 3 when screw 20 is in contact with the abutment 21. 26 is a small sheave or roller carried by a member 27 and adjustable as by screw 28 which serves as a stop to fix the limit of motion of the limb 19 in a clockwise direction.

In Fig. II. like numerals are used to indicate like parts and the only difference intended to be brought out by use of this figure is a coil 29 in series with the battery 5 which may be used to operate the core 17 in place of the series coil 10 in the main generator circuit of Fig. I.

An operation of my invention is substantially as follows:

If the dynamo be at rest or running at low speed, the switch 8 will be open and translating devices 6 may be maintained by the battery 5 in a well known manner. If the generator have its voltage raised until in excess of that of the battery, the switch 8 will close and current will flow from the generator 1 through lead 4, battery 5 and translating devices 6 to lead 7, switch 8, then through lead 9, coil 10 and lead 11 to the generator. Current will also flow through coil 23 which is shown in shunt across the generator and having in series therewith a variable resistance for the purpose of adjustment. This current will tend to raise the core 22 against the action of dashpot 24 and adjustable spring 25; and I so adjust the spring 25 that when the maximum desired voltage is reached across the generator circuit, the coil 23 will prevent this voltage from being exceeded by raising the core 22 smoothly against the action of dashpot 24 and thus raise the outer end of the lever or limb 19 away from the adjustable stop 26; and I so adjust the screw 20 that the same will make contact with the member 21 and then the levers 19 and 14 will act as a solid lever and swing the lever 13 in such manner as to relieve the pressure upon the carbon pile 3 and prevent this desired maximum voltage from being exceeded. If the generator be operating and regulated by the voltage regulator in the manner just described and a reduction be made in the resistance of the load circuit to such extent that the standard maximum voltage tends to increase the load upon the generator beyond a predetermined maximum, as for example its safe carrying capacity, I so adjust the spring 15 that coil 10 will raise core 17 evenly against the action of dashpot 18 and assist the coil 23 in regulating the generator even to the extent at times of usurping its functions entirely, as for example when the delivery of a maximum current may be caused by a voltage quite below that necessary to cause the coil 23 to increase the resistance 3, in which event the core 17 will raise the knuckle at pin 16 and coil 23 will allow the core 22 to fall and the lever 19 to rest upon its stop 26, while the entire regulation of the generator will be performed by the current coil 10 as may be the case at times when the battery is in a very low state of charge. In such cases, if the battery voltage rise as the same becomes charged, it may rise to such a point that coil 23 will lift its core 22, bring the screw 20 into contact with the member 21 and assist the coil 10 in the regulation of the generator even to the point of usurping the function of the said coil 10 and performing the real or major regulation of the generator.

The modification intended to be brought out in Fig. II. is the same as the operation of Fig. I. with the exception that the battery current only will affect the core 17 and the generator will be regulated with respect to battery current changes instead of main circuit current changes as in Fig. I.

In practice I prefer to make the arm 14 of short length as compared with the arm 19 so that the voltage coil will have considerably more leverage than the current coil in its lever so that the regulating means will respond a great deal more delicately to voltage fluctuations than to current fluctuations and the voltage regulating function will not be severely disturbed even though the current in the current coil vary considerably while below its maximum value. However, when the maximum current is reached, the current regulating instrumentalities come into play to regulate the generator, but by this construction I cause the current coil to produce a small effect tending to disturb the operation of the voltage coil so long as the current remains below the maximum, even though current responsive and voltage responsive means are mechanically connected and affect the carbon pile through a single instrumentality or abutting lever.

I do not wish in any way to limit myself to any of the exact details of construction or modes of operation set forth above merely to portray an embodiment of my invention for it is obvious that wide departure both in construction and in operation may be made without departing from the spirit and scope of my invention which is as set forth in the following claims:

1. The combination with a generator of means for regulating the same comprehending a regulating element, current responsive and voltage responsive means affected by the operation of said generator, a movable member for affecting the regulating element responsive to the current responsive means, a lever permanently connected to the aforesaid movable member and adapted under predetermined conditions to affect the same and movable with respect thereto and responsive to the voltage responsive means.

2. The combination with a generator of means for regulating the same comprehending a regulating element, a lever for affecting said element, a lever permanently connected therewith and movable with respect thereto, current responsive means operatively connected to the first named lever, voltage responsive means operatively connected to the second named lever and means whereby the second named lever may affect the first named lever.

3. The combination with a generator, of means for regulating the same comprehending a regulating element affecting said generator, means for affecting said element in response to current fluctuations comprising a lever, means capable of some independent motion mechanically connected therewith forming a freely movable extension of said lever and means for engaging the movable extension with the lever to increase the power thereof and voltage responsive means cooperating with said extension to move the same.

4. The combination with a generator of means for regulating the same comprehending a regulating element affecting said generator, means for affecting said element in response to current fluctuations comprising a lever, means mechanically connected permanently therewith by means of a knuckle-joint and forming an extension of said lever to increase the effective length thereof and voltage responsive means cooperating with said extension to move the same to affect the regulating element, said knuckle-joint permitting movement of the current responsive means without appreciable movement of the voltage responsive means.

5. Regulating means comprehending a movable element the motion of which affects the regulating function of said means, responsive means for moving said element, a freely movable element permanently united to a movable portion of the first named movable element, responsive means for moving said freely movable element and means whereby motion of said freely movable element affects the first named movable element under predetermined conditions.

6. Regulating means comprehending a movable element the motion of which affects the regulating function of said means, responsive means for moving said element, a freely movable element permanently united to a movable portion of the first named movable element, responsive means for moving said freely movable element and means whereby motion of said freely movable element affects the first named movable element under predetermined conditions and permits the responsive means affecting the first named movable element to freely move the same in one direction at all times.

7. Regulating means comprehending a movable element the motion of which affects the regulating function of said means, responsive means for moving said element, a freely movable element permanently united to a movable portion of the first named movable element, responsive means for moving said freely movable element and means whereby motion of said freely movable element affects the first named movable element under predetermined conditions and permits the responsive means affecting the first named movable element to freely move the same in one direction at all times and in an opposite direction under predetermined conditions only.

JOHN L. CREVELING.